US009488093B2

(12) United States Patent
Ruhland et al.

(10) Patent No.: US 9,488,093 B2
(45) Date of Patent: Nov. 8, 2016

(54) METHODS FOR REDUCING RAW PARTICULATE ENGINE EMISSIONS

(71) Applicant: Ford Global Technologies, LLC, Dearborn, MI (US)

(72) Inventors: Helmut Hans Ruhland, Eschweiler (DE); Georg Louven, Neuwied (DE)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 14/151,628

(22) Filed: Jan. 9, 2014

(65) Prior Publication Data

US 2014/0196685 A1 Jul. 17, 2014

(30) Foreign Application Priority Data

Jan. 11, 2013 (DE) ........................ 10 2013 200 331

(51) Int. Cl.

*B60T 7/12* (2006.01)
*F02B 17/00* (2006.01)
*F02D 41/06* (2006.01)

(Continued)

(52) U.S. Cl.

CPC ........... *F02B 17/005* (2013.01); *F02D 41/062* (2013.01); *F02D 41/3023* (2013.01); *F02D 41/3076* (2013.01); *F02D 41/064* (2013.01); *F02D 41/065* (2013.01); *F02D 41/401* (2013.01); *F02D 41/402* (2013.01); *F02D 2200/0602* (2013.01)

(58) Field of Classification Search

CPC ............. F02B 17/005; F02D 41/3023; F02D 41/3076; F02D 41/062; F02D 41/065; F02D 41/064; F02D 41/402; F02D 41/401; F02D 2200/0602

USPC ....... 123/431, 575, 576, 578, 435, 304, 305, 123/491, 179.14–179.17; 701/105

See application file for complete search history.

(56) References Cited

U.S. PATENT DOCUMENTS 5,058,547 A * 10/1991 Morikawa ............... F02B 33/30 123/198 D
5,179,926 A * 1/1993 Ament ................ F02D 41/0025 123/1 A
5,327,872 A * 7/1994 Morikawa ............ F02B 33/446 123/179.17

(Continued)

FOREIGN PATENT DOCUMENTS

DE 102008042558 A1 4/2010

*Primary Examiner* — Joseph Dallo
(74) *Attorney, Agent, or Firm* — Julia Voutyras; Alleman Hall McCoy Russell & Tuttle LLP

(57) ABSTRACT

The methods described allow for reducing particulate emissions from a direction injection engine during a starting phase, while also maintaining the engine start phase within a predetermined threshold. In one particular example, the methods comprise adjusting at least one of a fuel release pressure threshold and enrichment factor based on an engine condition; activating a starting device to rotate a crankshaft coupled to an engine cylinder without injecting any fuel; supplying fuel to the cylinder based on the enrichment factor only when a fuel pressure exceeds the fuel release pressure threshold; and stratifying a cylinder charge while adjusting a fuel injection within a compression phase and/or expansion phase of the engine. In this way, an amount of fuel injected may be evaporated in the combustion chamber while preventing a combustion wall wetting, which allows for reduced particulate emissions, particularly at reduced temperatures.

20 Claims, 8 Drawing Sheets

(51) Int. Cl.
*F02D 41/30* (2006.01)
*F02D 41/40* (2006.01)

(56) References Cited

U.S. PATENT DOCUMENTS 5,671,141 A * 9/1997 Smith .................... F02D 41/22 701/1
6,138,638 A * 10/2000 Morikawa ............. F02D 41/061 123/295
6,223,731 B1 * 5/2001 Yoshiume ........... F02D 41/1401 123/456
6,701,905 B1 * 3/2004 Gaskins .............. F02D 41/0027 123/458
7,805,985 B2 * 10/2010 Friedl .................. F02D 41/042 73/114.45
7,836,865 B2 11/2010 Joos et al.
8,954,221 B2 * 2/2015 Ohsaki ................ F02D 41/0235 701/31.1
2004/0245034 A1 * 12/2004 Miyamoto .............. F02D 41/22 180/170
2005/0274353 A1 * 12/2005 Okubo ................ F02D 41/0042 123/299
2006/0201468 A1 * 9/2006 Lancaster ............... F01N 3/323 123/179.5
2008/0041331 A1 * 2/2008 Puckett ................... F02D 41/22 123/198 D
2008/0210196 A1 * 9/2008 Ashizawa ........... F02D 13/0203 123/305
2008/0276906 A1 * 11/2008 Thomas .............. F02D 41/2438 123/457
2009/0025682 A1 * 1/2009 Okamoto ................ F02D 35/02 123/406.47
2009/0118986 A1 * 5/2009 Kita .......................... F02P 5/06 701/105
2009/0158711 A1 * 6/2009 Oshimi ............... F02D 13/0226 60/285
2009/0164101 A1 * 6/2009 Kageyama .............. F02D 37/02 701/103
2009/0272362 A1 * 11/2009 Yun ........................... F02B 1/12 123/295
2010/0175657 A1 * 7/2010 Pursifull ............... F02D 41/008 123/179.16
2012/0004801 A1 * 1/2012 Watanabe ............. F01N 3/2026 701/22
2012/0022740 A1 * 1/2012 Ohsaki ................ F02D 41/0235 701/33.9

* cited by examiner

500

| | | ENGINE PARAMETERS | | | |
|---|---|---|---|---|---|
| | | $P_{THRESHOLD}$ | FUEL INJECTION | SPARK TIMING | ENRICHMENT FACTOR |
| START TEMP. | COLD | DECREASED | EARLY | ADVANCED | ENRICHED |
| | HOT | INCREASED | LATE | RETARDED | ENLEANED |

FIG. 5

METHODS FOR REDUCING RAW PARTICULATE ENGINE EMISSIONS

CROSS REFERENCE TO RELATED APPLICATIONS

The present application claims priority to German Patent Application No. 102013200331.5, filed on Jan. 11, 2013, the entire contents of which are hereby incorporated by reference for all purposes.

FIELD

The present description relates to a method for reducing raw particulate emissions from a direct injection engine.

BACKGROUND AND SUMMARY

A fundamental aim of internal combustion engines is to minimize fuel consumption while increasing the overall engine efficiency. However, operating methods within a spark-ignition or applied-ignition engine render fuel consumption and efficiency problematic. For example, a conventional spark-ignition engine with intake manifold injection, also referred to as port fuel injection, operates with a homogeneous fuel/air mixture that is prepared by an external mixture formation by introducing the fuel into the air within the air intake manifold. Furthermore, load control is accomplished by means of a throttle valve provided within the intake manifold. In particular, closing of the throttle valve increases a pressure loss induced in the air across the throttle valve, which produces a lower induced air pressure downstream of the throttle valve and ahead of a cylinder inlet. In this way, the air mass (e.g., mass quantity) supplied to the engine cylinder may be adjusted by way of the induced air pressure. This method of load control, however, also has disadvantages, especially in the part load range, wherein low loads may require a high degree of throttling. However, the high degree of throttling may occur via a pressure reduction in the intake section, which results in exhaust and refill losses that rise with a decreasing loads.

In order to lower the above-described losses, various strategies for dethrottling an applied-ignition internal combustion engine have been developed. For example, one approach to dethrottling a spark-ignition engine is to inject fuel directly to the cylinders in the spark-ignition operating method. Thereby, direct injection of the fuel presents a suitable means for achieving a stratified combustion chamber charge, or a stratified charge operation, that allows substantial dilution of the mixture. This allows thermodynamic advantages to be realized, especially in part-load operations (e.g., in the lower and medium load ranges) when small quantities of fuel are injected. For this reason, the methods described herein, which form the subject matter of the present disclosure, employ a direct injection of the fuel into the engine cylinders.

Further advantages may be obtained on the basis of internal cooling, associated with direct injection, of the combustion chamber or of the mixture, thereby making possible higher compression and/or pressure charging and consequently enhanced fuel utilization without premature self-ignition of the fuel, which is referred to as engine knock or knocking, and which is otherwise a characteristic of spark-ignition engines.

A stratified-charge operation is distinguished by a very inhomogeneous combustion chamber charge with an ignitable fuel/air mixture having a comparatively high fuel concentration (e.g., $\lambda<1$) formed in the region of the ignition device, whereas a lower fuel concentration, e.g., higher local air ratios ($\lambda>1$), is/are present in the mixture layers situated therebelow. Overall, this leads to a lean combustion chamber charge having an overall air ratio $\lambda>>1$. In the context of the present disclosure, the air ratio is defined as the ratio of the air mass actually supplied to at least one cylinder of the internal combustion engine to the stoichiometric air mass, or the mass which would be just enough to fully oxidize the fuel mass supplied to the at least one cylinder (e.g., stoichiometric operation of the engine has $\lambda=1$).

With regard to direct injection, the fuel/air mixture is likely inhomogeneous during ignition and combustion, especially in a stratified charge operation since the mixture cannot be characterized by a single air ratio, but instead contains both lean mixture components ($\lambda>1$) and rich mixture components ($\lambda<1$). In particular, the formation of soot that is a characteristic of diesel-type methods is formed in mixture components having a substoichiometric air ratio (e.g., $\lambda<0.7$) and/or at temperatures above 1300 K under conditions of extreme oxygen deficiency.

Further, the time available for injecting fuel, preparing the mixture in the combustion chamber, namely the intermingling of air and fuel to a sufficiently desired extent, and preparing the fuel in the context of preliminary reactions, including vaporization, and ignition of the prepared mixture is comparatively short, and may be, for example, on the order of milliseconds. Therefore, in order to ensure reliable ignition of the fuel/air mixture when starting the internal combustion engine, especially during a cold start, previous methods describe injecting a multiple of the fuel mass which may burn stoichiometrically with the charge air in the cylinder during the starting phase. As such, enrichment factors (x) of 10 and above are not uncommon, wherein the enrichment factor x indicates (e.g., defines), the ratio of the fuel mass actually supplied to the stoichiometric fuel mass. By supplying an excess of fuel, the aim of these measures is to vaporize a sufficiently large fuel quantity to ensure reliable ignition. However, a disadvantage is that the excessive amount of fuel also leads to very high raw particulate emissions during the starting phase.

For this reason, to minimize the emission of soot particles, methods are known that employ regenerative particulate filters to filter soot particles out of the exhaust gas for storage until the soot particles are burned intermittently as part of a filter regeneration. For this purpose, oxygen or excess air is included in the exhaust gas to oxidize the soot collected within the filter, which is achieved for example via superstoichiometric operation ($\lambda>1$) of the engine.

With regards to filter regeneration, methods are known wherein the filter is regenerated on a regular basis, e.g., at specified fixed intervals. For instance, filter regeneration may be performed based upon reaching a predetermined mileage or time in service. Alternatively, it is also possible for the actual soot loading of the filter to be estimated by means of mathematical models or by measuring an exhaust gas backpressure that arises due to increasing flow resistance of the filter based upon the increased mass of particulates in the filter. Thereby, filter regeneration may be carried out when a maximum permissible loading, which may be specified, is reached. When no catalytic assistance is available, the high temperatures for regeneration of the particulate filter (e.g., about 550° C.) are achieved at high loads and high engine speeds during operation. Therefore, filter regenerations may occur infrequently when the engine is operated for short periods of time.

Frequent cold starts by the engine and/or short journey lengths/durations may further lead to high raw particulate emissions. Thereby, frequent regeneration of the particulate filter may become necessary, however, at the same time, the basic boundary conditions for regeneration of the particulate filter, in particular high temperatures, are not achieved. For this reason, engines are known that are fitted not only with a particulate filter but also with additional exhaust gas aftertreatment systems to reduce pollutant emissions. As such, the particulate filter can be designed in combination with one or more of said exhaust gas aftertreatment systems.

In particular, catalytic reactors are often used with spark-ignition engines. For example, in the case of three-way catalytic converters, nitrogen oxides $NO_x$ are reduced by means of the unoxidized components of the exhaust gas that are present, namely carbon monoxides CO and unburned hydrocarbons HC, while, at the same time, these exhaust gas components are oxidized. However, stoichiometric operation (with $\lambda \approx 1$) within narrow limits is necessary for this purpose. In the case of internal combustion engines operated with excess air, e.g., direct-injection spark-ignition engines or lean-burn spark-ignition engines, reducing the nitrogen oxides $NO_x$ in the exhaust gas is not possible, owing to the principle involved, that is to say owing to the absence of a reducing agent. Consequently, an exhaust gas aftertreatment system must be provided for the reduction of nitrogen oxides (e.g., a storage-type catalytic converter or a selective catalytic converter).

The inventors have recognized issues with the above-described approaches, and herein describe methods for reducing raw particulate emissions from a direct injection applied-ignition internal combustion engine. In particular, the methods comprise adjusting at least one of a fuel release pressure threshold and enrichment factor based on one or more engine conditions; activating a starting device to rotate a crankshaft coupled to an engine cylinder without injecting any fuel; supplying fuel to the cylinder based on the enrichment factor only when a fuel pressure exceeds the fuel release pressure threshold; and stratifying a cylinder charge while adjusting at least one fuel injection within a compression phase and/or expansion phase of the engine. In this way, the methods ensure that the fuel injected, which may be substantially reduced in some cases, evaporates in the combustion chamber while also preventing a combustion wall wetting due to the high levels of fuel overfueling, which leads to high particulate emissions. Therefore, in view of what has been stated above, one object of the present disclosure is to provide a means for overcoming the known disadvantages and, in particular, for reducing the raw particulate emissions during the starting phase of the engine, which is also regulated to maintain a start duration below a predetermined time threshold.

In one particular example, methods for reducing raw particulate emissions from an applied-ignition engine are described, wherein the engine comprises: at least one cylinder, in which a piston connected to a crankshaft oscillates between a bottom dead center position (BDC) and a top dead center position (TDC) when the internal combustion engine is in operation and in which an injection nozzle is provided for direct injection of fuel; a fuel supply system for supplying the at least one cylinder with fuel; and a starting device, by means of which the crankshaft is forced to rotate during starting. Further, during the starting of the engine, the example methods include activating the starting device in order to impart rotation to the crankshaft, wherein the at least one cylinder may be supplied with fuel only when the fuel pressure ($p_{fuel}$), in the fuel supply system has reached a threshold pressure, or minimum pressure ($P_{THRESHOLD}$) where $p_{fuel} \geq P_{THRESHOLD}$; and wherein a stratified cylinder charge is produced in the cylinder by means of at least one adjusted injection, for which purpose said at least one injection, in which the majority of the fuel is supplied, is carried out during the compression phase and/or expansion phase of the engine drive cycle.

In the methods according to the present disclosure, fuel is not necessarily injected in the first compression phase of the at least one cylinder or during the first revolution of the crankshaft but is instead injected only when the fuel pressure $p_{fuel}$ in the fuel supply system has reached a minimum pressure $P_{THRESHOLD}$. Thereby, the methods further relate to starting an engine from rest; only injecting fuel to a rotating engine after fuel pressure reaches a threshold; adjusting an air-fuel ratio produced by the injected fuel in the engine, the air-fuel ratio enleaned as the threshold is reduced; and spark-igniting the injected fuel in a stratified mixture. Likewise, the method also comprises enriching the air-fuel ratio as the threshold is increased. Assuming equal fuel quantities, a high fuel pressure shortens the duration of injection and further assists mixture preparation in the combustion chamber, in particular the atomization and vaporization of the fuel may occur in an advantageous manner. In this way, the technical result is achieved that allows a high injection pressure, and further makes it possible to introduce at least the majority of the fuel into the cylinder within a small crank angle window, in particular close to TDC. Further, a greater or lesser proportion of the injected fuel may reach the inner wall of the cylinder to mix with the adhering oil film, depending on the quantity of injected fuel and the duration of injection, or injection time. Therefore, it is not only that a portion of fuel may enter the crank case together with the oil and blow by gas for contribution to oil dilution, but that the fuel on the combustion chamber walls, which are cold during starting, contributes greatly to increased raw particulate emissions. Through modification of the lubricating properties of the oil, oil dilution has a substantial influence on wear and durability, e.g., the service life of the internal combustion engine. Thereby, the inventors herein realize that a late introduction of fuel close to TDC presents a suitable measure for substantially minimizing the proportion of fuel that reaches the inner wall of the cylinder during injection, and hence also presents a suitable measure for reducing raw particulate emissions during the starting phase.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 5 is an example table illustrating various engine parameter adjustments that can be made to reduce an engine start duration below a predetermined time threshold;

DETAILED DESCRIPTION

Figure 1:
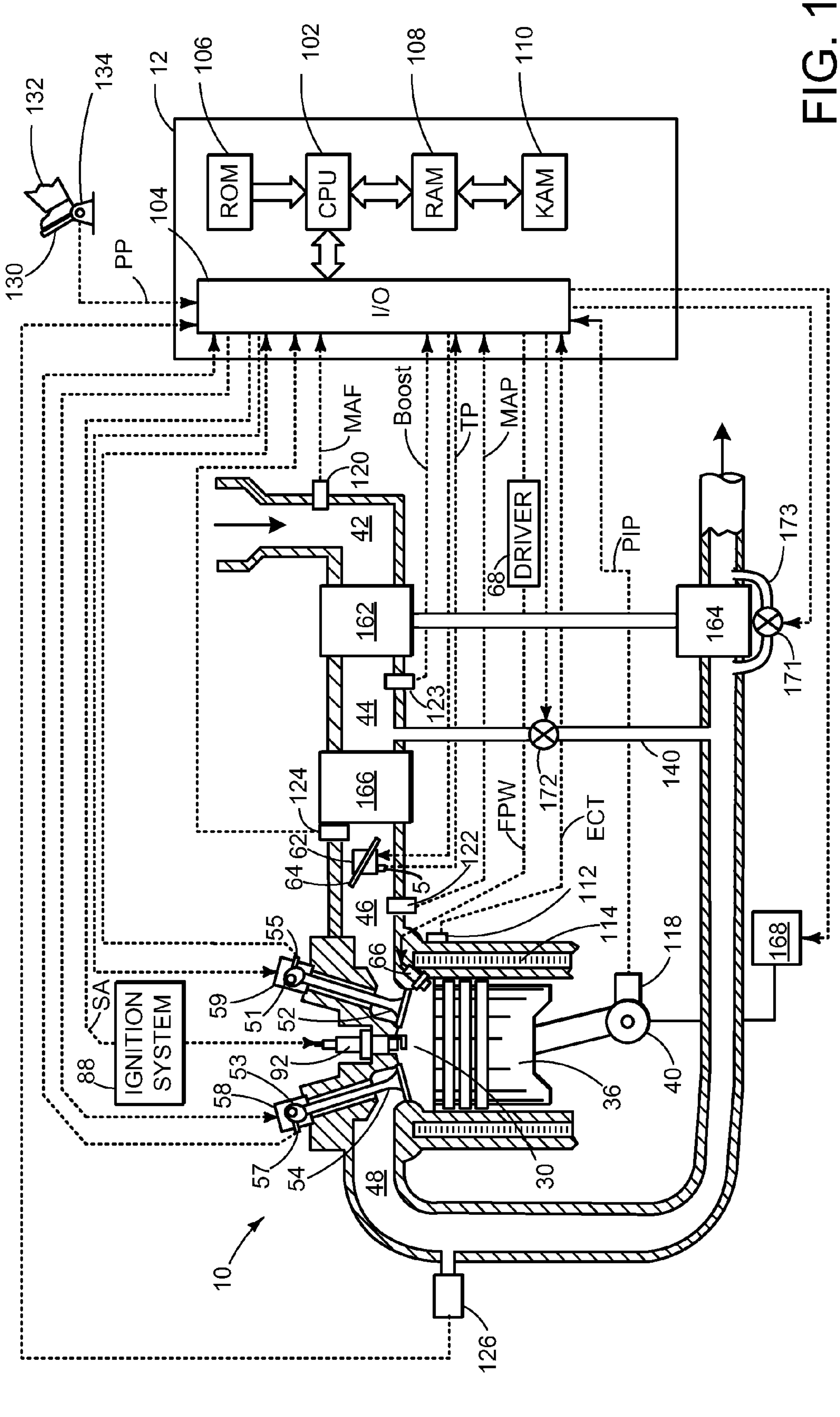
FIG. 1 shows an example engine system.
Figure 2:
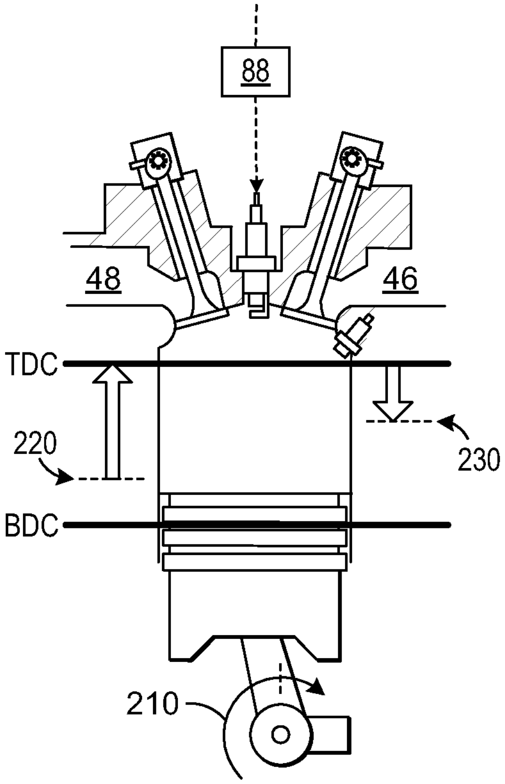
FIG. 2 shows an example cylinder to further illustrate an injection window relative to crank angle position.
Figure 3:
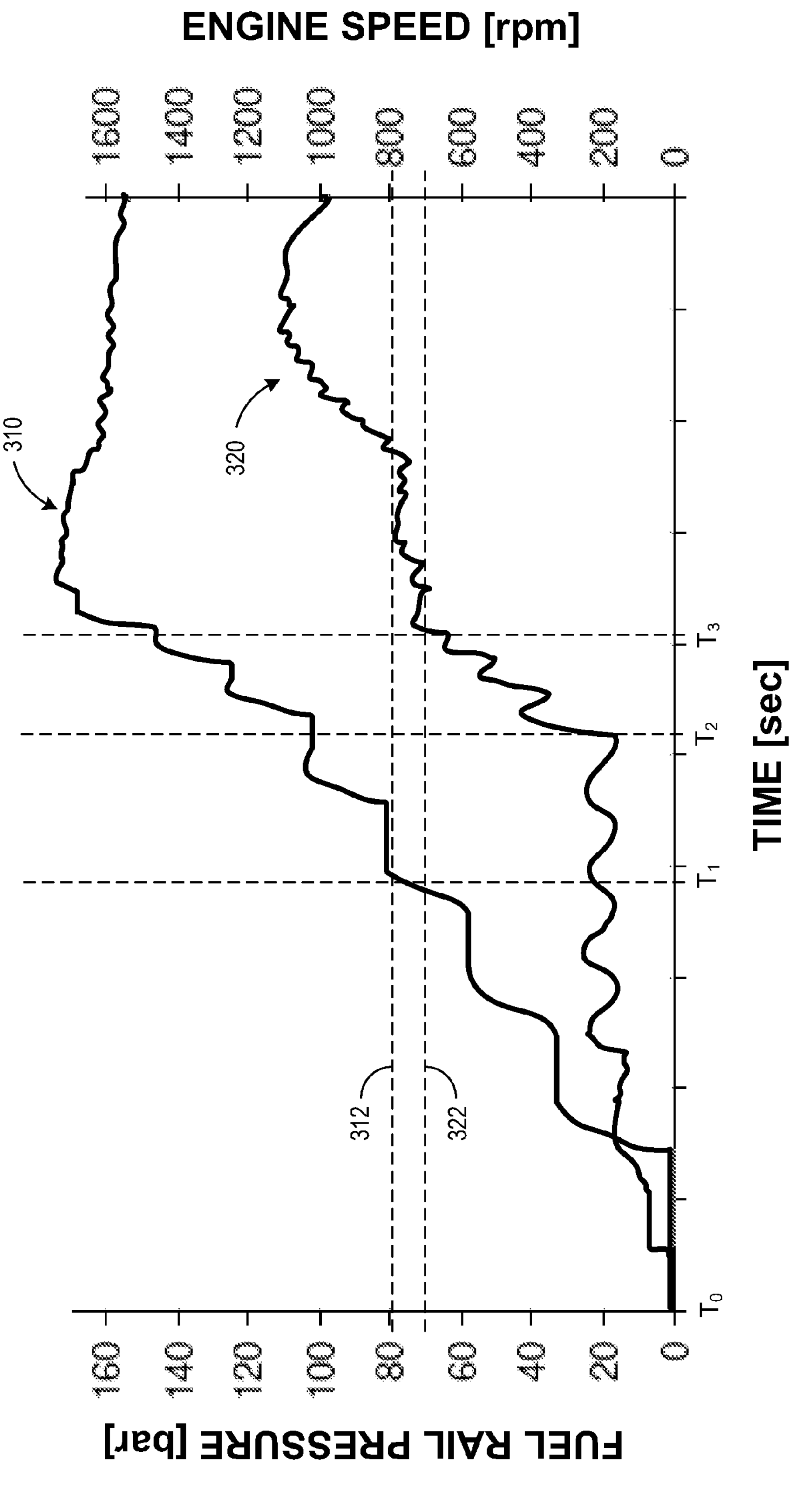
FIG. 3 shows a plot of fuel rail pressure versus time to illustrate how rail pressure increases in discrete steps by each lift of the fuel pump plunger.
Figure 4:
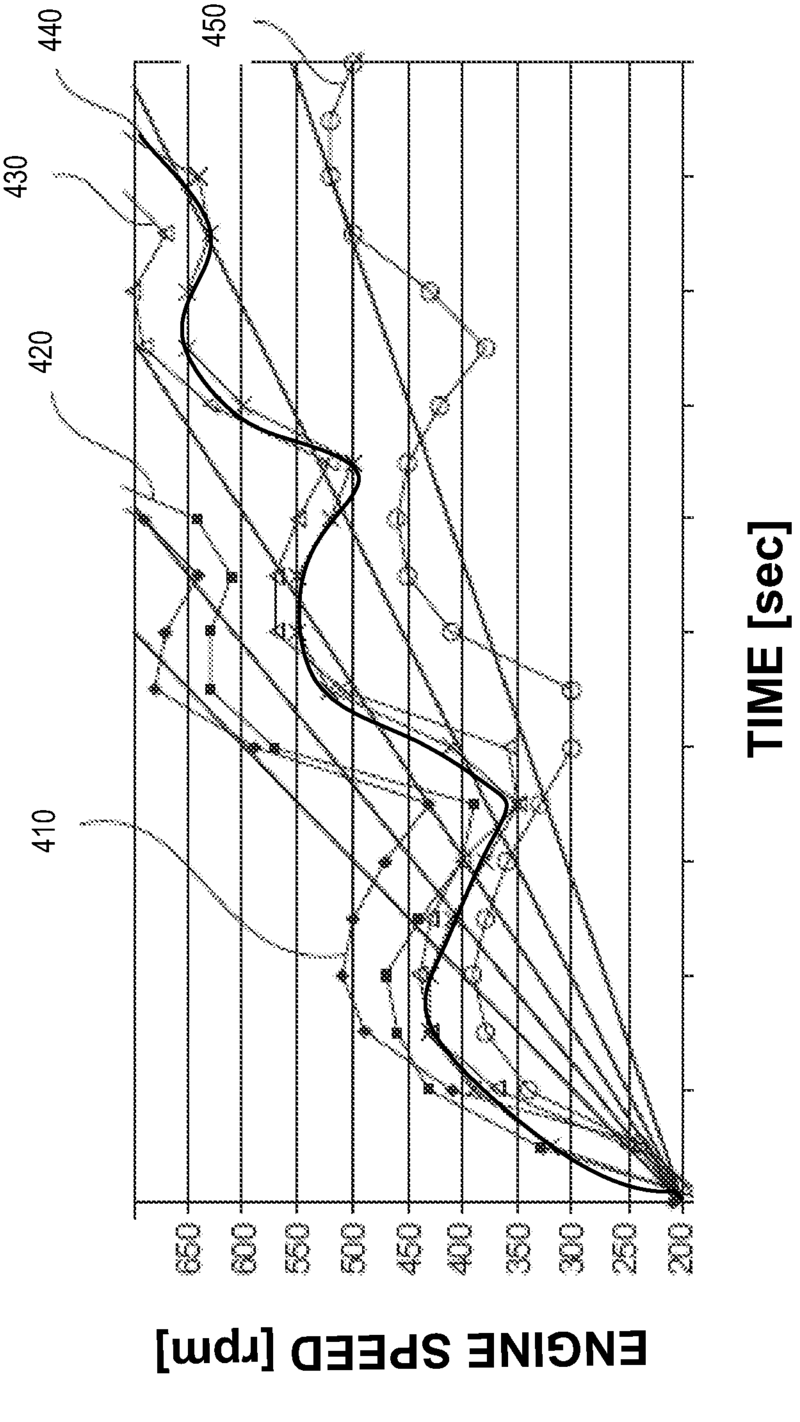
FIG. 4 shows a graphical illustration of the engine speed versus time during engine starting.
Figure 6:
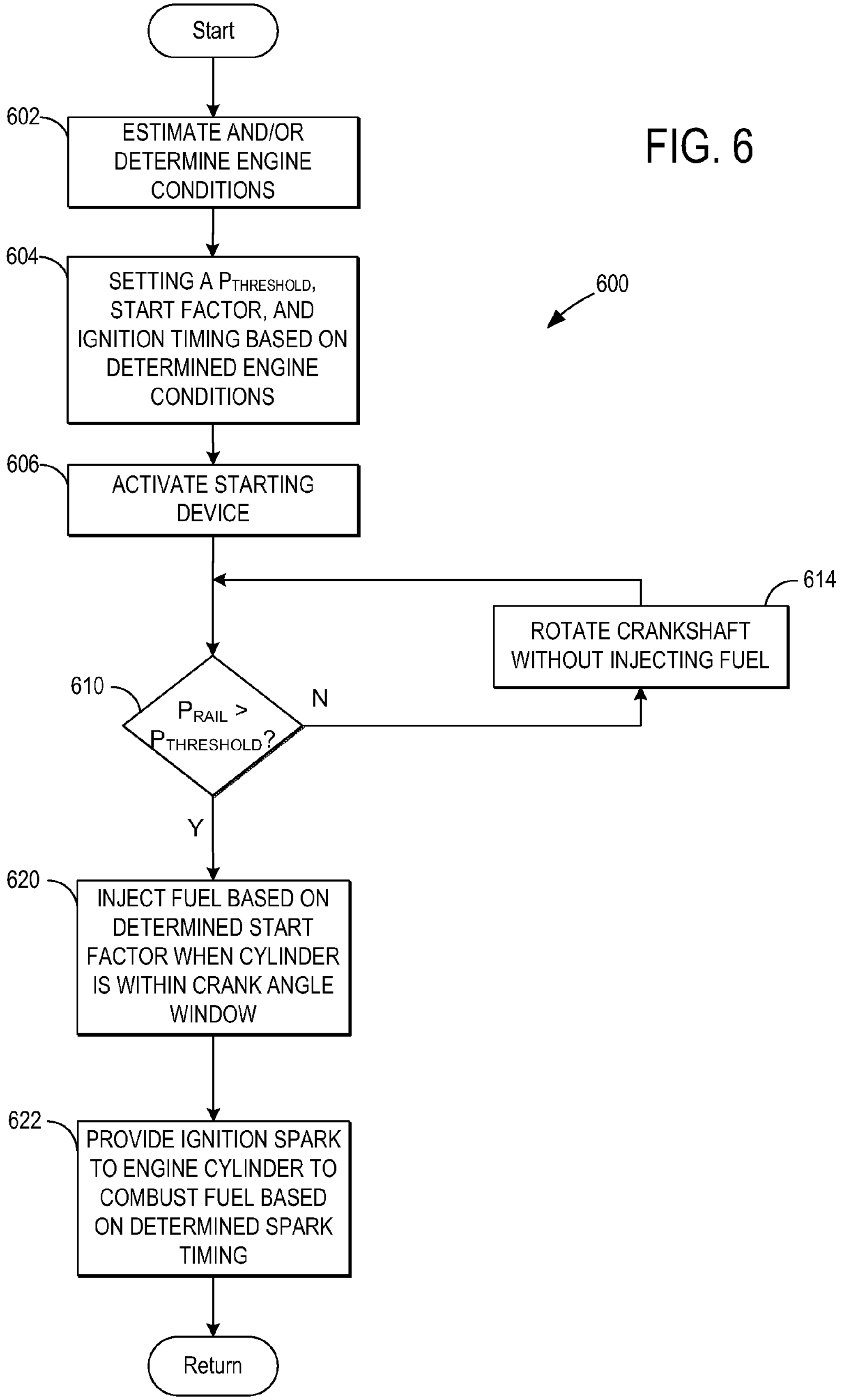
FIG. 6 illustrates an example flow chart for maintain the start duration of the engine below a threshold while optimizing an amount of fuel supplied according to the present disclosure.
Figure 7:
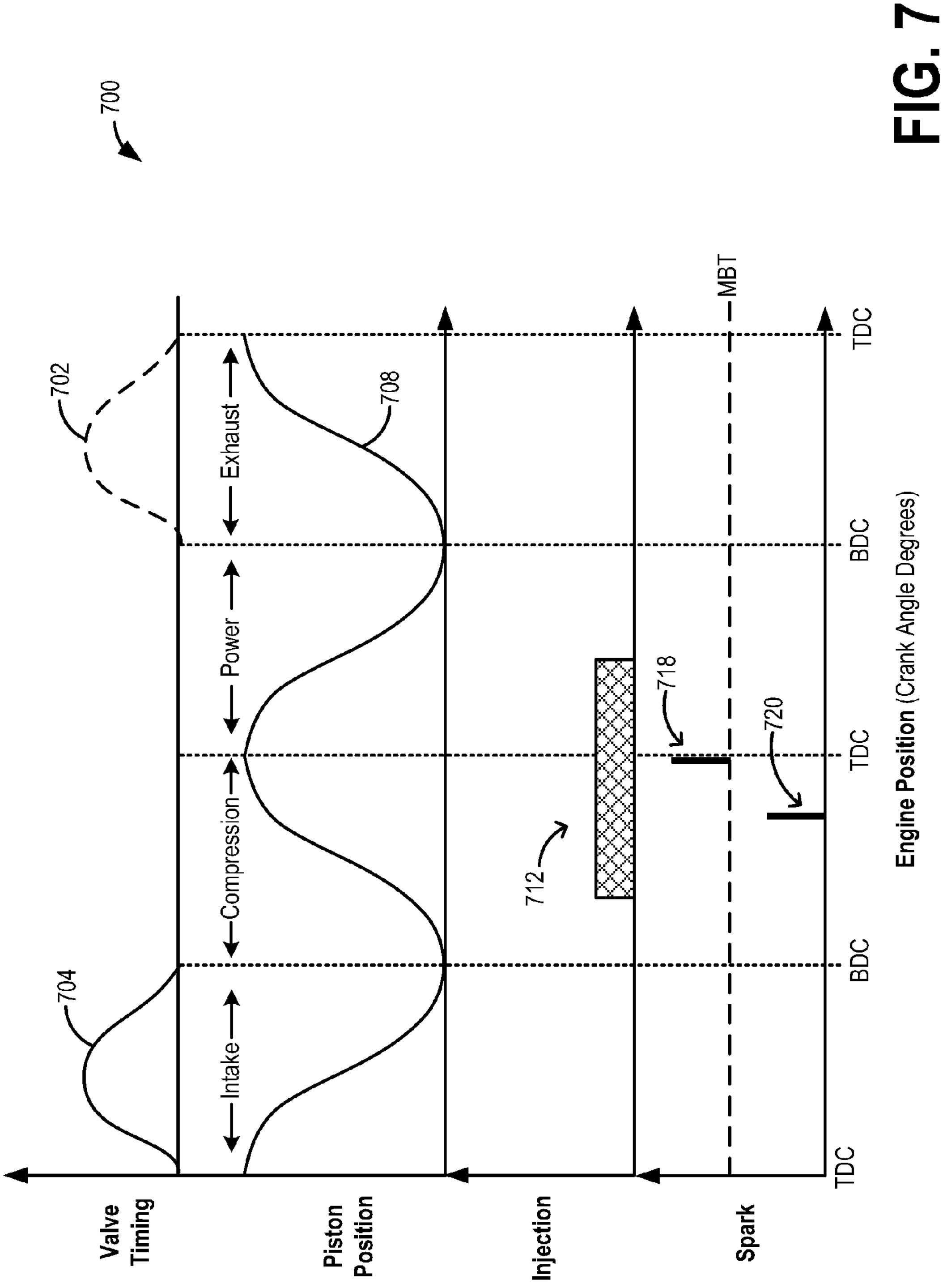
FIGS. 7-8 show example fuel injection profiles used during engine start and crank operations, according to the present disclosure.
Figure 8:
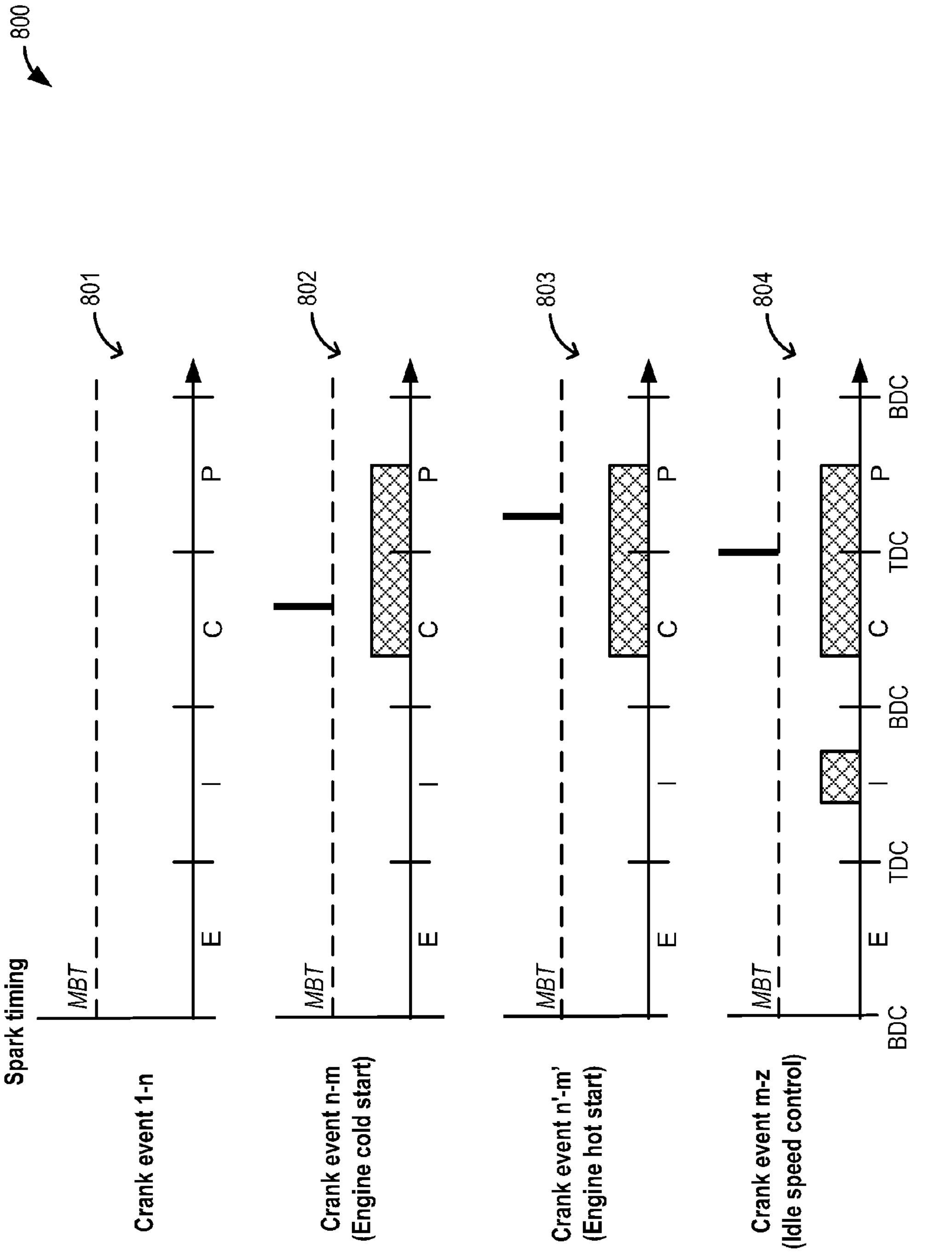

The methods described may reduce raw particulate emissions from an applied-ignition internal combustion engine. As such, FIGS. 1-2 shows an example engine diagram in which a piston connected to a crankshaft oscillates between a BDC position and a TDC position during engine operation, and in which an injection nozzle is provided for directly injecting the fuel. Then, FIGS. 3-4 illustrate the relationship of various engine parameters to engine start duration, which may be reduced relative to a time threshold using the methods described. FIG. 5 further illustrates how a controller may make one or more adjustments during the starting phase based on the engine conditions at engine start-up. FIG. 6 illustrates an example flow chart of the method according to the present disclosure, while FIGS. 7-8 provide graphical illustrations of the engine start and crank operations to provide an alternate illustration of the methods described herein.

Referring now to FIG. 1, internal combustion engine 10, comprising a plurality of cylinders, one cylinder of which is shown in FIG. 1, is controlled by electronic engine controller 12. Engine 10 includes combustion chamber (cylinder) 30 and cylinder walls 32 with piston 36 positioned therein and connected to crankshaft 40. Combustion chamber 30 is shown communicating with intake manifold 46 and exhaust manifold 48 via respective intake valve 52 and exhaust valve 54. Each intake and exhaust valve may be operated by an intake cam 51 and an exhaust cam 53. The opening and closing time of exhaust valve 54 may be adjusted relative to crankshaft position via cam phaser 58. The opening and closing time of intake valve 52 may be adjusted relative to crankshaft position via cam phaser 59. The position of intake cam 51 may be determined by intake cam sensor 55. The position of exhaust cam 53 may be determined by exhaust cam sensor 57. In this way, controller 12 may control the cam timing through phasers 58 and 59. Variable cam timing (VCT) may be either advanced or retarded, depending on various factors such as engine load and engine speed (RPM).

Fuel injector 66 is shown positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system is used to generate higher fuel pressures. In addition, intake manifold 46 is shown communicating with optional electronic throttle 62 which adjusts a position of throttle plate 64 to control air flow from intake boost chamber 44. Compressor 162 draws air from air intake 42 to supply intake boost chamber 44. Exhaust gases spin turbine 164 which is coupled to compressor 162 which compresses air in boost chamber 44. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Turbocharger waste gate 171 is a valve that allows exhaust gases to bypass turbine 164 via bypass passage 173 when turbocharger waste gate 171 is in an open state. Substantially all exhaust gas passes through turbine 164 when waste gate 171 is in a fully closed position.

Further, in the disclosed embodiments, an exhaust gas recirculation (EGR) system may route a desired portion of exhaust gas from exhaust manifold 48 to intake boost chamber 44 via EGR passage 140. The amount of EGR provided to intake boost chamber 44 may be varied by controller 12 via EGR valve 172. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below. Specifically, EGR contains a large amount of water as it is a combustion by-product. Since EGR is at a relatively high temperature and contains a lot of water, the dew-point temperature may also be relatively high. Consequently, condensate formation from EGR can even be much higher than condensate formation from compressing air and lowering it to the dew-point temperature.

Intake boost chamber 44 may further include charge air cooler (CAC) 166 (e.g., an intercooler) to decrease the temperature of the turbocharged or supercharged intake gases. In some embodiments, CAC 166 may be an air to air heat exchanger. In other embodiments, CAC 166 may be an air to liquid heat exchanger. CAC 166 may include a valve to selectively modulate the flow velocity of intake air traveling through the charge air cooler in response to condensation formation within the charge air cooler.

Hot charge air from the compressor 162 enters the inlet of the CAC 166, cools as it travels through the CAC 166, and then exits to pass though the throttle 62 and into the engine intake manifold 46. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged into the engine during selected engine operating conditions, such as during acceleration events. However, if the condensate is introduced at once into the engine during an acceleration event, there may be an increase in the chance of engine misfire or combustion instability (in the form of late/slow burns) due to the ingestion of water. Thus, condensate may be purged from the CAC to the engine under controlled conditions. This controlled purging may help to reduce the likelihood of engine misfire events. In one example, condensate may be purged from the CAC using increased airflow during a tip-in condition. In another example, condensate may be pro-actively purged from the CAC by increasing airflow to the engine intake while controlling engine actuators to maintain torque demand.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of turbine 164. Alternatively, a two-state exhaust gas oxygen sensor may be substituted for UEGO sensor 126.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 46, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (or BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (or TDC). In a process hereinafter referred to as injection, fuel is introduced into the combustion chamber. In a process hereinafter referred to as ignition, the injected fuel is ignited by known ignition means such as spark plug 92, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity or cold temperature conditions. In particular, MBT may be advanced to account for the slow burn rate. During the expansion stroke, the expanding gases push piston 36 back to BDC. Crankshaft 40 converts piston movement into a rotational torque of the rotary shaft. Crankshaft 40 may be used to drive alternator 168. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 is shown in FIG. 1 as a conventional microcomputer including: microprocessor unit 102, input/output ports 104, an electronic storage medium for executable programs and calibration values shown as read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a pedal position sensor 134 coupled to an accelerator pedal 130 for sensing force applied by vehicle operator 132; a measurement of engine manifold absolute pressure (MAP) from pressure sensor 122 coupled to intake manifold 46; a measurement of boost pressure (Boost) from pressure sensor 123; a measurement of inducted mass air flow (MAF) from mass air flow sensor 120; a measurement of throttle position (TP) from a sensor 5; and temperature at the outlet of a charge air cooler 166 from a temperature sensor 124. Barometric pressure may also be sensed (sensor not shown) for processing by controller 12. In a preferred aspect of the present description, engine position sensor 118 produces a profile ignition pickup signal (PIP). This produces a predetermined number of equally spaced pulses every revolution of the crankshaft from which engine speed (RPM) can be determined. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. Other sensors not depicted may also be present, such as a sensor for determining the intake air velocity at the inlet of the charge air cooler, and other sensors.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 132. These actuators may adjust certain engine control parameters including: variable cam timing (VCT), the air-to-fuel ratio (AFR), alternator loading, spark timing, throttle position, etc. For example, when an increase in PP is indicated (e.g., during a tip-in) from pedal position sensor 134, torque demand is increased.

In some examples, storage medium read-only memory 106 may be programmed with computer readable data representing instructions executable by microprocessor unit 102 for performing the methods described below as well as other variants that are anticipated but not specifically listed.

FIG. 2 shows the example cylinder of FIG. 1 along with an injection window to further illustrate how a fuel injection and/or spark timing can be made before TDC via first distance 220 or after TDC via second distance 230 relative to crank position 210 of the engine. As described herein, an engine fuel injection and/or ignition timing may be advanced or retarded relative to MBT to reduce the engine start duration below a predetermined time threshold (e.g., 1 second). Thereby, as the engine crank position changes based on the crank angle during rotation, piston 36 reciprocates between TDC and BDC within the combustion chamber. According to the present disclosure, the fuel injection and spark ignition timing may be controlled such that the injection and/or spark occurs before (advanced) or after (retarded) the manufacturer's specified time. For example, spark timing may be retarded from MBT timing to control engine knock or advanced under high humidity or cold temperature conditions. In particular, MBT may be advanced to account for the slow burn rate that occurs at colder temperatures. As one example, a fuel injection and/or spark timing may occur in an injection window of 125° of crank angle before ignition top dead center and 75° of crank angle after ignition top dead center. As such, first distance 220 and second distance 230 may be defined based on the relative crank position before and after TDC, respectively.

FIG. 3 shows a plot 310 of fuel rail pressure (left vertical axis) versus time to illustrate how rail pressure increases in discrete steps by each lift of the fuel pump plunger. FIG. 3 further shows a plot 320 of the engine speed (right vertical axis) versus time. As one example, an engine may be configured to perform a fuel injection once a fuel pressure exceeds a threshold, e.g., fuel release pressure threshold 312. In this way, fuel rail pressure release threshold 312 has a direct impact on the engine start duration. In FIG. 3, the time period prior to $T_1$ indicates a time period wherein the starting device is activated to rotate a crankshaft coupled to the engine cylinder without injecting any fuel. Then, once the fuel pressure exceeds the fuel release pressure threshold, one or more injections may be made to begin the combustion process. As noted above, the high pressure methods described herein may be used to ensure that the fuel injected evaporates in the combustion chamber while preventing wall wetting due to high levels of fuel overfueling, which may lead to high particulate emissions.

Subsequent to $T_1$, fuel may be released in a process known as injection based on the fuel pressure exceeding the fuel release pressure threshold. As such, one or more fuel injections may be performed during each cycle of the engine in the time period between $T_1$ and $T_2$. Furthermore, at $T_2$, a fuel ignition may be performed, for example, via spark plug 92. In this way, the engine start further includes supplying fuel to the cylinder based on an enrichment factor, where the enrichment factor is defined by the ratio of the actually supplied fuel mass to the fuel mass required for stoichiometric combustion when the fuel pressure exceeds the fuel release pressure threshold.

Between $T_2$ and $T_3$, an engine ramp up whose rate of ramping depends on the enrichment factor selected may be performed. Thus, the enrichment parameter has a direct impact on the ramp up time and emissions of the engine from start activation to idle speed, which occurs once the engine speed reaches the engine speed threshold 322. For example, engine speed threshold 322 is herein set to be 700 RPM, as indicated in FIG. 3. As such, the ramp up time to 700 rpm indicates the end of the engine start duration. In this way, the method described aims to perform all phases of the engine start process within a predetermined time threshold in order to optimize the start duration.

FIG. 3 indicates that a reduction of the injection fuel release pressure threshold represents an appropriate measure to reduce the start duration. However, to ensure that the injection does not wait for the next cycle beyond the fuel release pressure threshold 312 due to piece to piece tolerances, wear, and ambient conditions, controller 12 may be configured to adjusted the injection fuel release pressure threshold relative to the fuel pressure build up curve (e.g., curve 310) to a value that just precedes a pressure plateau phase that lies near fuel release pressure threshold 312. In addition, the engine ramp up time may be further adjusted to decrease the engine start duration, for example, based on an enrichment factor, as shown in FIG. 4 below.

FIG. 4 further shows the engine speed n against time during starting in a diagram for different enrichment factors (e.g., herein referred to as x for simplicity). Therein, a total of five method variants are shown, wherein curve 410 illustrates the starting process or ramp up time for an enrichment factor $x_{410}$=0.8, curve 420 illustrates the starting process for an enrichment factor $x_{420}$=0.6, curve 430 illustrates the starting process for an enrichment factor $x_{430}$=0.4, curve 440 illustrates the starting process for an enrichment factor $x_{440}$=0.3 and curve 450 illustrates the starting process for an enrichment factor $x_{450}$=0.2. Regression lines are also co-plotted along with the example data to further guide the eye.

FIG. 4 shows that lean operation during start-up generates less indicated mean effective pressure (IMEP), and thereby reduces the torque used for accelerating the engine. As noted above, curves shown represent different start-factors, wherein the gradients in the graph indicate different speed changes during speed ramp up. As modern engine controls enable a cycle based fueling, FIG. 4 indicates that the engine speed ramp up may be used to adjust the engine start duration in combination with the fuel release pressure threshold 312. Furthermore, the engine start duration may be tailored to customer or installation demands by utilizing the stratified potential of an engine at lean operation. The objective is to reduce the engine start duration below a predetermined time threshold by applying a late high pressure start. Moreover, by utilizing the methods herein, engine emissions may be reduced with less injected fuel to reduce the amount of wall wetting accordingly based on the enrichment factor. The methods further allow for a robust engine start, wherein the engine start is deemed robust when each injection ends up in combustion, for example. Therefore, any occurrence of an engine misfire during start may be used as an indicator of the enrichment factor (or starting factor) getting too low.

As one example, the inventors have studied and analyzed the engine ramp up time as a criterion for a robust start based on cylinder pressure traces during the startup process. Therein, start factor reduction tests were conducted at two engine start temperature levels, e.g., −10 deg C. and 20 deg C. At −10 deg C., engine misfiring events during start were observed at an enrichment factor of 0.8. Therefore a start factor of, e.g., 1, may be used to ensure a robust engine start is achieved while also controlling the duration of the engine ramp up time. Alternatively, at 20 deg C., engine misfiring events during start were observed at an enrichment factor of 0.2. Therefore a start factor of, e.g., 0.3, may be used to ensure a robust engine start is achieved while also controlling the duration of the engine ramp up time. In this way, the enrichment factor may be adjusted based on the temperature to achieve a desired engine ramp up time.

Continuing with the description of FIG. 4, the duration of starting may be shortened by choosing a higher enrichment factor. In the present case, the starting process is regarded as complete when an engine speed of n=700 rpm is reached, for example. Therefore, the enrichment factors shown indicate that curve 450, e.g., x<0.3, leads to unacceptably long starting times based on the time scale shown. That is, the time point at the right vertical axis indicates a time threshold whereby the ramp up process is to have been completed in this example. In contrast, the duration of starting at higher enrichment factors, e.g., curves 410 and 420 indicate a small difference in ramp up time relative to the other curves having reduced enrichment factors. That is, virtually no time difference is observed at high enough enrichment factors.

The adjustment of a fuel injection during the compression phase and/or expansion phase further represents a suitable way to dilute the mixture by means of a stratified combustion chamber charge, that is, of achieving pronounced stratified charge operation.

Tests have shown that enrichment factors x of less than 1, and even substantially less than 1, namely enrichment factors x of 0.3, can be achieved while still maintaining an acceptable start duration relative to the predetermined time threshold. This means that the method according to the present disclosure allows such a dilution of the mixture that significantly less fuel can be injected, even during the starting phase, than could, in principle, be burnt stoichiometrically with the charge air in the cylinder. This is an improvement by comparison to the enrichment factors x of up to 10 and above that are known and often used in engine start strategies. Thereby, the methods according to the present disclosure lead to further advantages by reducing raw particulate emissions during the starting phase.

With respect to the engine operating parameters, advantageous embodiments may be achieved wherein at least one injection is performed close to ignition TDC, wherein the at least one injection is initiated between 125° of crank angle before TDC and 75° of crank angle after TDC. As already described, the proportion of fuel which reaches the inner walls of the cylinders during the injection process and hence the raw particulate emissions can be significantly reduced by injection close to TDC. In particular, the above method may use established engine conditions to specify a crank angle window for initiation of the injection process, e.g., for the beginning of injection, wherein the injection process is concluded within the crank angle range specified, or in some instances also outside of the injection window. Further embodiments are advantageous, in particular, that allow for the at least one injection to be performed close to TDC, wherein the at least one injection is initiated between 90° of crank angle before TDC and 45° of crank angle after TDC. Still further, embodiments are likewise advantageous, wherein the at least one injection is performed close to TDC, and wherein the at least one injection is initiated between 60° of crank angle before TDC and 15° of crank angle after TDC. In this way, the injection window described with respect to FIG. 2, may be adjusted based upon an engine condition, e.g., an engine temperature, to achieve a robust engine start while also maintaining an engine start duration below the predetermined time threshold.

For example, FIG. 5 shows example table 500 illustrating various engine parameter adjustments that can be made according to the methods herein to reduce the engine start duration below the predetermined time threshold. As noted above, lean engine operations during start generates less IMEP. Therefore, longer engine ramp up times may be observed in some instances since a reduced IMEP reduces the torque for accelerating the engine. Likewise, a reduced temperature may affect the fuel pressure build up during the cranking phase since the pressure may be reduced in proportion to the reduced temperatures. In this way, curve 310 may further have a temperature dependence based on the ambient conditions such that a slower rate of increase in fuel pressure may be observed at colder temperatures relative to curve 310. As such, at colder temperatures, the fuel release pressure threshold may be decreased so that the fuel injection is made to occur more quickly within the predetermined start period. In addition, the enrichment factor may also be adjusted to achieve an engine ramp up time that completes the engine start within the predetermined time period. For example, because temperature and pressure are related, an increased injection pressure may be obtained by selecting a higher enrichment factor in some instances. Thus, although the engine ramp up time may be slower, the reduced fuel release pressure threshold may be reduced to achieve the fuel release pressure threshold more quickly. Moreover, because colder temperatures are present, an ignition timing may be advanced since the fuel does not burn instantaneously, but instead takes a brief period of time for the combustion gases to expand. Thus, at colder temperatures, e.g., below freezing, one or more of the fuel injection and spark timing may be advanced relative to the injection window described with respect to FIG. 2 to achieve an optimal combustion event. As another example, an engine may be started from rest by performing an engine cold start, wherein the cold start is indicated by an engine temperature that coincides with an ambient temperature. For example, an engine that has cooled to the ambient conditions of the vehicle after shutting the vehicle off may represent an engine cold start.

Conversely, at increased temperatures, e.g., at ambient temperatures on a sunny and warm afternoon, gases may expand and therefore exhibit a higher pressure. When this is the case, a fuel release pressure threshold may be increased while still maintaining a time period of the cranking phase below the predetermined time threshold without fuel injection. In addition, the amount of fuel supplied via the enrichment factor may be reduced to supply an amount of fuel based on the increased temperatures. In other words, the fuel may be enleaned at higher temperatures. Furthermore, the spark timing may be retarded at higher temperatures since any combustion gases present may expand more quickly upon a spark event. In this way, the fuel injection and spark timing (e.g., combustion) may be made to occur later in the injection window to achieve an optimal combustion event. The methods described are based upon the angular or rotational speed of the engine, which may be lengthened or shortened relative to the time frame wherein burning and expansion occur, and such that an engine idle speed is achieved in the predetermined time threshold. As described herein, embodiments of the method in which the at least one injection is initiated or carried out in the compression phase are advantageous. Likewise, embodiments of the method in which the at least one injection is initiated or carried out in the expansion phase can also be advantageous. Although described herein with respect to an engine temperature, the methods may alternatively or additionally be based on one or more other engine parameters.

For clarity, if injection is initiated in the expansion phase and hence carried out very late, combustion of the fuel/air mixture is also delayed, that is, shifted into the expansion phase, and possibly into crank angle ranges in which the outlet of the cylinder is already open. In this way, an exhaust gas enthalpy may be increased, more specifically also by the fact that the wall heat losses are limited owing to the retarded injection. Thereby, the exhaust gas temperature of the exhaust gas expelled into the exhaust system may be increased. The increased exhaust gas temperature leads, inter alia, also to more rapid heating of a particulate filter provided in the exhaust system, with the result that the high temperatures required for filter regeneration may also be achieved on short journeys and that it may be possible to carry out regeneration of the particulate filter. The increased exhaust gas enthalpy also has advantages in respect to an exhaust turbocharger provided, the turbine of which is arranged in the exhaust system, may then be supplied with an exhaust gas having a higher enthalpy, which thereby makes it possible to enhance the torque characteristic of the internal combustion engine.

As already explained elsewhere, the fuel pressure has a significant influence on the time or length of injection in terms of crank angle that is used to determine injection of a predetermined fuel quantity. In connection with the method according to the present disclosure, advantages may be achieved wherein as short an injection duration as possible is achieved, in principle, in order to enhance the emissions behavior and reduce raw particulate emissions. For example, embodiments of the method in which the fuel release pressure threshold (e.g., the minimum pressure $p_{fuel,min}$ for injecting) is given by $p_{fuel,min} \geq 30$ bar are advantageous. Tests have indicated that substantial improvements can be achieved with pressures of 30 bar in some instances.

However, embodiments of the method in which the fuel release pressure threshold is 50 bar, in particular embodiments of the method in which the fuel release pressure threshold is 75 bar, are also advantageous. For example, higher fuel pressures are found to be advantageous in respect of the atomization and vaporization of the fuel in the combustion chamber so long as fuel evaporation occurs in the combustion chamber while also preventing a combustion wall wetting due to the fuel injection. According to the methods described, the initial revolutions of the crankshaft are used to build up a sufficiently high fuel pressure in the fuel supply system wherein no fuel is injected during the first operating cycle.

Turning to the enrichment factor, embodiments of the method in which the internal combustion engine is operated with an enrichment factor $x \leq 3$ in the starting phase are advantageous. Further, embodiments of the method in which the internal combustion engine is operated with an enrichment factor $x \leq 1.5$ in the starting phase may also be advantageous in some instances. As described already, the lower the enrichment factor selected (e.g., in combination with the fuel release pressure threshold), the less fuel is introduced into the cylinder as part of the injection. Thereby, the methods described may achieve advantages since emissions behavior, in particular with regard to raw particulate emissions, may be reduced during the engine start process. As such, the methods attain further advantages by injecting as much fuel as can be burnt stoichiometrically with the charge air in the cylinder, that is $x \approx 1$, or by injecting less fuel by selecting $x \leq 1$ in order to ensure that little excess fuel or substantially no excess fuel is made available to form soot under conditions of oxygen deficiency. In this way, embodiments of the method in which the internal combustion engine is operated with an enrichment factor $x \leq 0.8$ in the starting phase are also advantageous. Further, embodiments of the method in which the internal combustion engine is operated with an enrichment factor $x \leq 0.6$ in the starting phase are likewise advantageous in some instances. Further still, embodiments of the method in which the internal combustion engine is operated with an enrichment factor $x \leq 0.4$ in the starting phase may also be advantageous in some cases.

Although not described in greater detail, embodiments of the methods in which a pilot injection is carried out or initiated in the intake phase are advantageous. For example, injecting a relatively small fuel quantity during the intake phase ensures that a homogenized fuel/air mixture is present in the entire combustion chamber based on the main injection according to the present disclosure, during which the majority of the fuel is made available for combustion, is initiated or carried out.

Turning to a brief description of the method, FIG. 6 illustrates example method 600 for starting the engine in a predetermined time period while also reducing engine emissions according to the present disclosure.

At 602, method 600 includes determining one or more engine conditions or parameters. For example, prior to starting a vehicle, a temperature sensor may determine one or more of an ambient temperature and/or pressure, in addition to an engine temperature. Then, based on the measured engine condition, at 604, method 600 further includes setting one or more of a fuel rail pressure threshold ($P_{THRESHOLD}$), an enrichment factor, and an ignition timing based on the determined engine conditions. For example, on a cold winter day, the fuel rail pressure threshold may be reduced to decrease the time it takes for the build-up of the fuel rail pressure during the cranking phase to reach the fuel rail pressure threshold. Moreover, the timing of the fuel injection can also be set along with the enrichment factor (e.g., to increase an engine ramp rate) such that engine start occurs within the predetermined time threshold, which in some instances may be set to 1 second. In some embodiments, controller 12 may be configured to set the one or more parameters based on a look-up table that comprises engine parameters comprising the engine conditions to be measured. However, in other embodiments, a model-based approach may be used to determine the engine parameters as a function of the one or more engine conditions, e.g., a temperature and/or pressure.

At 606, method 600 includes activating the starting device to rotate the crankshaft coupled to an engine cylinder without injecting any fuel while at 610, controller 12 may compare a fuel rail pressure to a threshold, e.g., via a pressure sensor, to determine whether the fuel pressure exceeds the fuel release pressure threshold while the engine is activated and cranking. As described herein, method 600 may include setting the threshold based on one or more engine conditions, and adjusting the air-fuel ratio responsive to the threshold. In this way, to ensure that the engine is started in the predetermined time period, the method further includes decreasing the threshold to decrease a time for the fuel pressure to reach the threshold while decreasing the air-fuel ratio responsive to the decreased threshold, and increasing the threshold to increase the time for the fuel pressure to reach the threshold while increasing the air-fuel ratio responsive to the increased threshold. However, in some instances, the air-fuel ratio may be increased regardless of the threshold, for example, to minimize an engine start duration.

If the fuel pressure falls below the fuel release pressure threshold, method 600 proceeds to 614 by continuing the engine starting process while rotating the crankshaft without injecting any fuel. As described above, the rail pressure will increase during the cranking phase without injection in discrete steps by each lift of the fuel pump plunger. Alternatively, once the fuel rail pressure exceeds, or is sufficiently close to the fuel release pressure threshold (e.g., within a tolerance) such that an injection before the next plateau conserves substantial time during the engine start process, method 600 may proceed to 622 and inject fuel based on the determined enrichment factor while piston 36 falls within the crank angle window or injection window as described above. At 624, method 600 includes providing a spark based on the determined ignition timing such that an optimal combustion reaction occurs during the engine start process. In this way, the various engine parameters related to the start duration may be adjusted based on one or more engine conditions while maintaining a start duration within the predetermined window.

FIGS. 7-8 show example fuel injection profiles used during engine start and crank operations, according to the present disclosure.

FIG. 7 shows a map 700 of valve timing and piston position, with respect to an engine position, for a given engine cylinder. During an engine start, while the engine is being cranked, an engine controller may be configured to adjust a fuel injection profile of fuel delivered to the cylinder. In particular, fuel may be delivered as a first profile during the engine start, and then transitioned to a second, different profile following engine cranking. The differing fuel injection profiles may include a directly injected portion of fuel delivered as a single compression stroke injection, a single expansion stroke injection, or a combination thereof, and sometimes in combination with one or more intake stroke injections.

Map 700 illustrates an engine position along the x-axis in crank angle degrees (CAD). Curve 708 depicts piston positions (along the y-axis), with reference to their location from TDC and/or BDC, and further with reference to their location within the four strokes (intake, compression, power and exhaust) of an engine cycle. As indicated by sinusoidal curve 708, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 702 and 704 depict valve timings for an exhaust valve (dashed curve 702) and an intake valve (solid curve 704) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced. As a result of the timing differences between exhaust valve closing and intake valve opening, for a short duration, before the end of the exhaust stroke and after the commencement of the intake stroke, both intake and exhaust valves may be open. This period, during which both valves are open, is referred to as a positive intake to exhaust valve overlap (or simply, positive valve overlap). In one example, the positive intake to exhaust valve overlap may be a default cam position of the engine present during an engine cold start.

The third plot (from the top) of map 700 depicts an example fuel injection window 712 that straddles a compression phase and expansion phase of the engine, and that may used at engine start, and during engine cranking, to reduce an amount of engine start exhaust PM emissions without degrading engine combustion stability. As elaborated herein, the injection profile may be adjusted based on crank event number since an injection profiles may be adjusted based on the various engine parameters.

In the depicted example, a fuel injection profile used during a crank event is depicted after a fuel pressure exceeds a fuel rail pressure threshold. Herein, the engine start is an engine cold start, therefore, the engine timing is shown advanced relative to MBT. An engine controller is configured to provide an amount of fuel to the cylinder based on the enrichment factor within the fuel injection window depicted at 712. In particular, the first fuel injection may be advanced as shown at 720 relative to MBT, which is schematically shown at 718. In addition to adjusting a fuel injection, a spark ignition timing may also be adjusted. For example, spark timing may be advanced relative to MBT such as when the engine is started at extreme cold temperatures. As an alternate example, spark may be retarded with the addition of a direct compression injection.

Now turning to FIG. 8, map 800 shows example fuel injection profiles 801-804 that may be used during an engine start, during cranking, and during engine idle control. As elaborated herein, the injection profiles may be adjusted based on a crank event number from the engine start, as well as based on whether the engine start is a cold engine start or a hot engine start. The injection profile further depicts whether ignition timing adjustments were also performed (e.g., via the use of a fuel injection retard and/or spark retard).

A first example injection profile that may be used, e.g., during an engine cold start is shown at 801. In particular, first injection profile 801 depicts fuel injection to a cylinder during a first phase of cranking operation, wherein the engine is activated but no fuel is injected. For simplicity, the first phase of cylinder crank events is referred to as events 1-n. During the engine starting phase wherein the fuel pressure falls below the fuel release pressure threshold, no fuel is injected into the cylinder as the fuel pressure is built up by rotating the crankshaft according to the methods already described.

A second example injection profile that may be used during an engine cold start is shown at 802. In particular, second injection profile 802 depicts fuel injection to a cylinder during a second phase wherein ignition combustion events occur based on a desired engine ramp rate. In particular, second injection profile 802 depicts fuel injection to a cylinder during a second phase of cranking operation during the compression and/or expansion phases. For simplicity, the second phase of cylinder crank events during a cold start are referred to as event n-m. The second injection profile further illustrates how an ignition timing may be advanced, but still fall within the injection window relative to MBT.

A third example injection profile that may be used during an engine hot start is shown at 803. For example, when an engine is restarted after a brief time period following an engine shut down, the temperature therein may remain elevated relative to the ambient temperature conditions outside of the vehicle. As such, one or more engine parameters may be adjusted in the manner described above based on a determined engine temperature. In particular, third injection profile 803 also depicts fuel injection to a cylinder during the second phase wherein ignition combustion events occur based on a desired engine ramp rate, and wherein the engine start falls below the predetermined time threshold. In particular, third injection profile 803 depicts fuel injection to a cylinder during a second phase of cranking operation during the compression and/or expansion phases. For simplicity, the second phase of cylinder crank events during a hot start are referred to as event n'-m', which may be different from the cylinder crank events for an engine cold start. The third injection profile further illustrates a retarded ignition timing relative to MBT that still falls within the injection window.

A fourth example injection profile that may be used following engine start and cranking, and after an engine idle speed has been attained is shown at 804. In particular, fourth injection profile 804 depicts fuel injection to a cylinder for a number of cylinder crank events since the completion of cranking (e.g., referred to as events m through z, for simplicity). During the engine idle control while the engine is warming up, fuel injection may be transitioned to a profile where the portion of fuel injected into the cylinder is similar to the fueling events during the other phases, but also with an injection during the intake stroke. When an engine operates at idle speed, for example, as shown at 804, an ignition timing may be set to MBT based on the desired engine operations and performance.

In this way, the methods according to the present disclosure allow for the generation of a high injection pressure while further making it possible to introduce at least a majority of the fuel into the cylinder within a small crank angle window, in particular close to TDC. Thereby, a lesser proportion of the injected fuel may reach the inner wall of the cylinder to mix with the adhering oil film, depending on the quantity of injected fuel and the duration of injection. As such, the late introduction of fuel close to TDC during compression and/or expansion presents a suitable measure for substantially minimizing the proportion of fuel that reaches the inner wall of the cylinder during injection, and hence also presents a suitable measure for reducing raw particulate emissions during the starting phase.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for reducing particulate emissions from a direct injection applied-ignition engine during a starting phase, comprising:

adjusting at least one of a fuel release pressure threshold and enrichment factor based on one or more engine conditions;

activating a starting device to rotate a crankshaft coupled to an engine cylinder without injecting any fuel;

before fuel pressure exceeds the fuel release pressure threshold, rotating the crankshaft without injecting any fuel;

supplying fuel to the cylinder based on the enrichment factor only when the fuel pressure exceeds the fuel release pressure threshold; and stratifying a cylinder charge while adjusting at least one fuel injection within one of a compression phase and expansion phase of the engine.

2. The method of claim 1, wherein the at least one adjusted injection is performed close to ignition top dead center, and wherein the at least one injection is initiated in a crank angle range defined by at least one of:

125° before ignition top dead center and 75° after ignition top dead center;

90° before ignition top dead center and 45° after ignition top dead center; and

60° before ignition top dead center and 15° after ignition top dead center.

3. The method of claim 2, wherein the at least one adjusted injection is initiated during the compression phase.

4. The method of claim 2, wherein the at least one adjusted injection is initiated in the expansion phase.

5. The method of claim 1, wherein a spark timing is advanced as an engine temperature decreases, and wherein the fuel release pressure threshold includes a pressure threshold from a group consisting of 30 bar, 50 bar, and 75 bar.

6. The method of claim 1, wherein the engine is operated during the starting phase with an enrichment factor that falls below an enrichment threshold, and wherein the enrichment factor is defined by a ratio of an actually supplied fuel mass to a fuel mass required for stoichiometric combustion, the enrichment threshold being selected from a group consisting of 3, 1.5, 0.8, 0.6, and 0.4.

7. The method of claim 1, wherein the fuel release pressure threshold decreases and the enrichment factor increases as engine temperatures decrease.

8. The method of claim 7, further including advancing at least one of a fuel injection and spark timing based on the reduced fuel release pressure threshold.

9. The method of claim 1, wherein the fuel release pressure threshold increases and the enrichment factor decreases as engine temperatures increase.

10. The method of claim 9, further including retarding at least one of a fuel injection and spark timing based on the increased fuel release pressure threshold.

11. The method of claim 1, wherein a pilot injection is carried out during an intake phase, and wherein both a fuel injection timing is adjusted and the enrichment factor is further adjusted such that an engine start occurs within a predetermined amount of time.

12. A method for starting an engine from rest, comprising:

injecting no fuel into a rotating engine before fuel pressure reaches a threshold;

only injecting fuel to the rotating engine after fuel pressure reaches the threshold;

adjusting an air-fuel ratio produced by the injected fuel in the engine, the air-fuel ratio enleaned as the threshold is reduced; and spark-igniting the injected fuel in a stratified mixture.

13. The method of claim 12, further comprising injecting fuel within a window defined by a crank angle that falls within the range of 125° before ignition top dead center and 75° after ignition top dead center.

14. The method of claim 12, further comprising enriching the air-fuel ratio as the threshold is increased, and wherein the threshold is based on an engine temperature, the threshold increasing as the engine temperature increases and decreasing as the engine temperature decreases.

15. The method of claim 13, wherein starting the engine from rest includes performing an engine cold start, the engine cold start being indicated by an engine temperature that coincides with an ambient temperature.

16. The method of claim 15, further comprising setting the threshold based on one or more engine conditions, and adjusting the air-fuel ratio responsive to the threshold, the method further including decreasing the threshold to decrease an amount of time for the fuel pressure to reach the threshold while enleaning the air-fuel ratio, and increasing the threshold to increase the amount of time for the fuel pressure to reach the threshold while enriching the air-fuel ratio.

17. A method for regulating an engine start phase, comprising:

activating a starting device to rotate a crankshaft coupled to an engine cylinder while injecting no fuel to build up a fuel pressure;

cranking an engine with no fuel injected while the fuel pressure is below a fuel release pressure threshold;

supplying fuel to the cylinder only when the fuel pressure exceeds the fuel release pressure threshold; and stratifying a cylinder charge while adjusting a fuel injection within an injection window that straddles a compression phase and expansion phase of the engine.

18. The method of claim 17, wherein the fuel release pressure threshold decreases as temperatures decrease and increases as temperatures increase.

19. The method of claim 18, wherein an enrichment factor defined by a ratio of an actual fuel mass supplied to a fuel mass required for stoichiometric combustion is adjusted to adjust an engine ramp up time, and wherein an air-fuel ratio is increased as the fuel release pressure threshold decreases and decreases as the fuel release pressure threshold increases.

20. The method of claim 19, wherein the injection window comprises a crank angle falling within the range of 125° before ignition top dead center and 75° after ignition top dead center.

* * * * *